US012772068B2

(12) United States Patent
Schwengler et al.

(10) Patent No.: US 12,772,068 B2
(45) Date of Patent: Oct. 20, 2026

(54) SPECTRUM ACCESS SYSTEM AND ACCESS PROBE HYBRID FRAMEWORK

(71) Applicant: CenturyLink Intellectual Property LLC, Denver, CO (US)

(72) Inventors: Thomas Schwengler, Lakewood, CO (US); Stewart Gormley, Littleton, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 275 days.

(21) Appl. No.: 18/828,312

(22) Filed: Sep. 9, 2024

(65) Prior Publication Data

US 2025/0016575 A1 Jan. 9, 2025

Related U.S. Application Data

(63) Continuation of application No. 18/199,254, filed on May 18, 2023, now Pat. No. 12,089,055, which is a continuation of application No. 17/397,025, filed on Aug. 9, 2021, now Pat. No. 11,659,404, which is a continuation of application No. 16/804,478, filed on Feb. 28, 2020, now Pat. No. 11,096,062.

(60) Provisional application No. 62/959,652, filed on Jan. 10, 2020.

(51) Int. Cl.

| | |
|---|---|
| ***H04W 16/14*** | (2009.01) |
| ***H04L 5/00*** | (2006.01) |
| ***H04W 48/02*** | (2009.01) |
| ***H04W 48/14*** | (2009.01) |
| ***H04W 72/0453*** | (2023.01) |
| ***H04W 74/00*** | (2009.01) |
| ***H04W 74/0833*** | (2024.01) |

(52) U.S. Cl.

CPC ........... *H04W 16/14* (2013.01); *H04L 5/0048* (2013.01); *H04W 48/02* (2013.01); *H04W 48/14* (2013.01); *H04W 72/0453* (2013.01); *H04W 74/002* (2013.01); *H04W 74/0833* (2013.01)

(58) Field of Classification Search

None

See application file for complete search history.

(56) References Cited

U.S. PATENT DOCUMENTS

| | | | | |
|---|---|---|---|---|
| 10,187,875 | B2 * | 1/2019 | Chen | H04L 27/0006 |
| 10,602,368 | B2 | 3/2020 | Mueck | |
| 10,893,417 | B1 * | 1/2021 | Gandhi | H04W 48/08 |
| 11,218,213 | B2 * | 1/2022 | Taneja | H04B 7/155 |
| 11,758,619 | B2 * | 9/2023 | Mueck | H04W 48/10 370/328 |

(Continued)

*Primary Examiner* — Hong S Cho

(57) ABSTRACT

Novel tools and techniques for are provided for implementing a hybrid spectrum access system and access probe framework. A system includes a base station coupled to a network, a spectrum access system, and user equipment coupled to the base station and the spectrum access system. The user equipment is configured to transmit, to the base station, a first network access request following a first access sequence while transmitting signals under a first power limit. If no response is obtained from the base station, the user equipment is configured to transmit a second network access request above the first power limit, but under a second power limit. The user equipment is configured to obtain spectrum access from the spectrum access system and transmit a second network access request to the base station.

10 Claims, 7 Drawing Sheets

(56) References Cited

U.S. PATENT DOCUMENTS

| | | | | |
|---|---|---|---|---|
| 2008/0221951 | A1* | 9/2008 | Stanforth | G06Q 10/063<br>705/7.41 |
| 2014/0237547 | A1* | 8/2014 | Bose | H04W 12/08<br>726/3 |
| 2015/0245374 | A1* | 8/2015 | Mitola, III | H04W 16/14<br>370/329 |
| 2018/0115908 | A1* | 4/2018 | Wang | H04W 16/14 |
| 2020/0260487 | A1* | 8/2020 | Bhattad | H04L 5/0051 |
| 2021/0219144 | A1 | 7/2021 | Schwengler | |
| 2021/0368353 | A1 | 11/2021 | Schwengler | |
| 2023/0292137 | A1 | 9/2023 | Schwengler | |

* cited by examiner

200

SPECTRUM ACCESS SYSTEM AND ACCESS PROBE HYBRID FRAMEWORK

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to network access systems, and more specifically to a hybrid framework for accessing a network.

BACKGROUND

Citizens broadband radio service (CBRS) is a new band of spectrum made available for use in the US where power is restricted by type of transmitter. In CBRS, citizens broadband radio service devices (CBSD) are classified by type, which include category A, category B, category C, and end user device (EUD). Each of the types of CBSD are restricted by maximum equivalent isotropically radiated power (EIRP). CBRS utilizes a spectrum access system to manage use of the CBRS spectrum by CBSDs.

In typical code division multiple access (CDMA) networks, access channels utilize successive access probes of increasing power. In long term evolution (LTE) networks, such as an LTE machine type communication (LTE-M) network, a random access (RA) procedure is followed by user equipment (UE) to request access to the LTE-M network. In the RA procedure, a UE transmits a physical random access channel (PRACH) RA preamble sequence, where the power level of the PRACH preamble and PRACH repetitions are ramped up based on a coverage enhancement (CE) level. Thus, some existing access techniques may conflict with access to the CBRS spectrum.

Accordingly, tools and techniques for implementing a hybrid SAS and access probe network access framework are provided.

BRIEF DESCRIPTION OF THE DRAWINGS

A further understanding of the nature and advantages of the embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
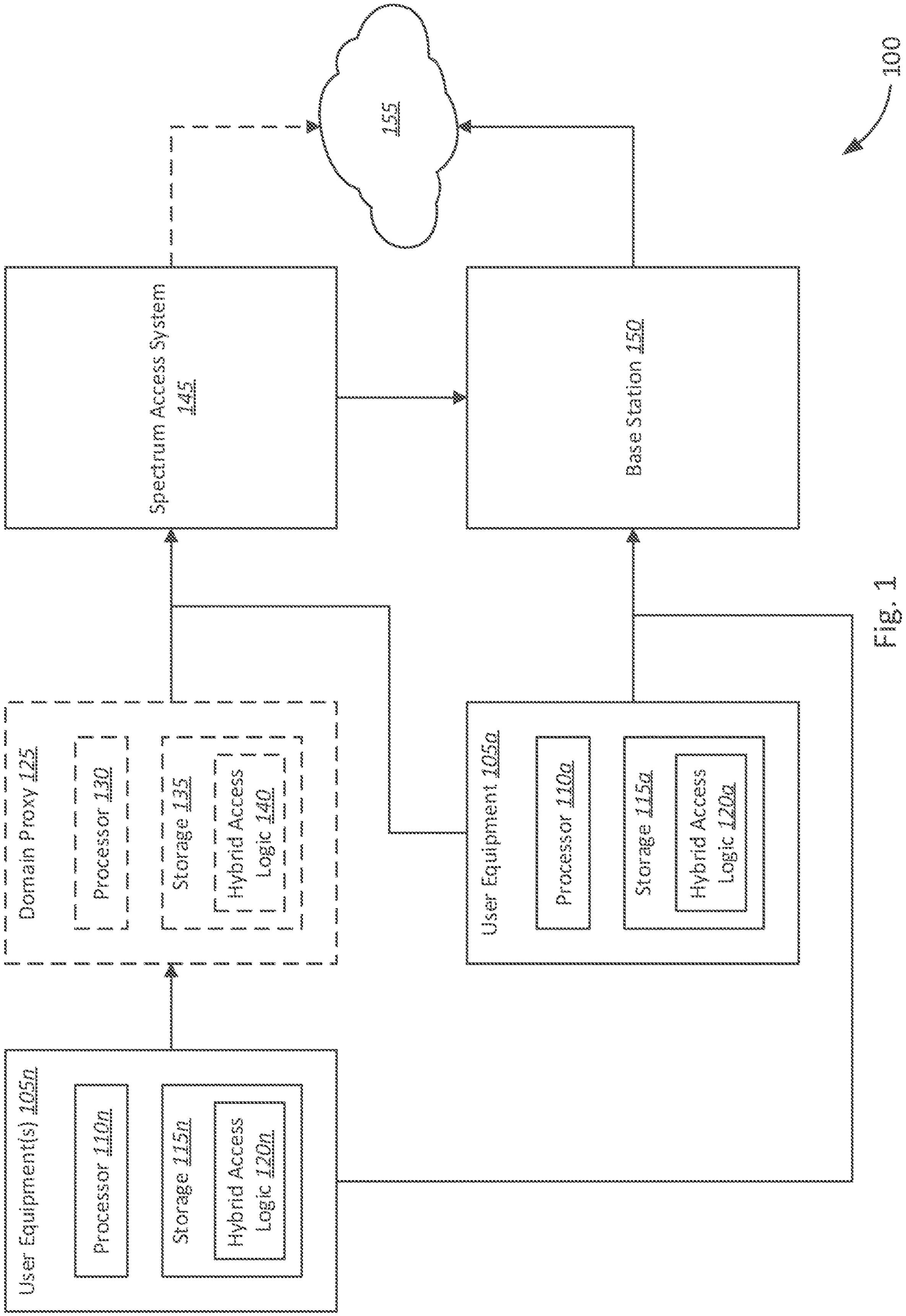
FIG. 1 is a schematic block diagram of a system for a hybrid SAS and access probe network access framework, in accordance with various embodiments.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The various embodiments include, without limitation, methods, systems, and/or software products. Merely by way of example, a method may comprise one or more procedures, any or all of which are executed by a computer system. Correspondingly, an embodiment may provide a computer system configured with instructions to perform one or more procedures in accordance with methods provided by various other embodiments. Similarly, a computer program may comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In an aspect, a system for implementing a spectrum access system and access probe hybrid framework is provided. The system includes a base station coupled to a network, a spectrum access system, and a user equipment coupled to the base station and the spectrum access system. The user equipment includes a processor, and non-transitory computer readable media comprising instructions executable by the processor to cause the user equipment to perform various operations. For example, the instructions may be executed by the processor to transmit, to the base station, a first network access request, the first network access request comprising a first access sequence including of one or more access request signals, and determine whether a response granting access to the network has been received from the base station. In response to determining a response granting access to the network has not been received, the user equipment may transmit a spectrum access request to the spectrum access system, wherein the spectrum access request includes a request for access to one or more frequency ranges of a spectrum. The instructions may be further executable by the processor to obtain, via the spectrum access system, a spectrum access response, wherein the spectrum access response is indicative of whether access to at least one of the one or more frequency ranges of the spectrum has been granted. In response to the spectrum access response indicating access to the at least one of the one or more frequency ranges of the spectrum has been granted, the instructions may further be executed by the processor to transmit a second network access request to the base station, and establish, in response to the response granting access to the network has been received from the base station, a communication channel with the base station.

Another aspect provides an apparatus for implementing a spectrum access system and access probe hybrid framework is provided. The apparatus includes a processor, and non-transitory computer readable media comprising instructions executable by the processor to transmit, to a base station, a first network access request, the first network access request comprising a first access sequence including of one or more access request signals, and determine whether a response granting access to a network has been received from the base station. In response to determining a response granting access to the network has not been received, the apparatus may transmit a spectrum access request to a spectrum access system, wherein the spectrum access request includes a request for access to one or more frequency ranges of a spectrum. The instructions may further be executable by the processor to obtain, via the spectrum access system, a spectrum access response, wherein the spectrum access response is indicative of whether access to at least one of the one or more frequency ranges of the spectrum has been granted, and in response to the spectrum access response indicating access to the at least one of the one or more frequency ranges of the spectrum has been granted, transmit a second network access request to the base station. The instructions may further be executed by the processor to establish, in response to the response granting access to the network has been received from the base station, a communication channel with the base station.

In a further aspect, a method for a spectrum access system and access probe hybrid framework is provided. The method includes transmitting, via user equipment, a first network access request to a base station, the first network access request comprising a first access sequence including of one or more access request signals, and determining, via the user equipment, whether a response granting access to a network has been received from the base station. The method continues, in response to determining a response granting access to the network has not been received, by transmitting, via the user equipment, a spectrum access request to a spectrum access system, wherein the spectrum access request includes a request for access to one or more frequency ranges of a spectrum, and obtaining, via the spectrum access system, a spectrum access response, wherein the spectrum access response is indicative of whether access to at least one of the one or more frequency ranges of the spectrum has been granted. The method further includes, in response to the spectrum access response indicating access to the at least one of the one or more frequency ranges of the spectrum has been granted, transmitting, via the user equipment, a second network access request to the base station, and establishing, in response to the response granting access to the network has been received from the base station, a communication channel between the base station and user equipment.

FIG. 1 is a schematic block diagram of a system 100 for hybrid SAS and access probe network access framework. In various embodiments, the system 100 includes one or more user equipment (UEs) 105*a*-105*n*, including a first UE 105*a*, and nth UE 105*n*. Each of the one or more UEs 105*a*-105*n* may include a respective processor 110*a*-110*n*, storage 115*a*-115*n*, and hybrid access logic 120*a*-120*n*. The system 100 may include a domain proxy 125, which includes processor 130, storage 135, and hybrid access logic 140. The system 100 further includes spectrum access system (SAS) 145, base station 150, and a communication network 155. It should be noted that the various components of the system 100 are schematically illustrated in FIG. 1, and that modifications to the system 100 may be possible in accordance with various embodiments.

In various embodiments, the first UE 105*a* may include processor 110*a* and storage 115*a*. Storage 115*a* may include hybrid access logic 120*a*. The first UE 105*a* may be coupled to the SAS 145 and base station 150. The nth UE 105*n* may similarly be coupled to the SAS 145 and base station 150. In some embodiments, the nth UE 105*n* may be coupled to the SAS 145 via a domain proxy 125. Accordingly, in some examples, the nth UE 105*n* may be coupled to a domain proxy 125, which may in turn be coupled to the SAS 145. In various embodiments, the domain proxy 125 may be coupled to one or more UEs, including the nth UE 105*n*. The SAS 145 and base station 150 may, in turn, be coupled to a communication network 155, respectively.

In various embodiments, the one or more UEs 105*a*-105*n*, may include various types of end-user devices, which may be configured to access and/or communicate over the communication network 155. For example, a UE may include, without limitation, a mobile device, such as a smartphone, tablet, hotspot, smart watch or other wearable device, or a laptop computer with suitable wireless transceiver, modem, and/or transceiver. The communication network 155 may include a provider network, backbone network, core network, edge network, or other suitable communication network.

In various embodiments, each of the one or more UEs 105*a*-105*n* may be configured to request access to the communication network 155 utilizing the hybrid SAS and access probe framework. For example, in some embodiments, the way in which each respective UE of the one or more UEs 105*a*-105*n* requests access to the communication network 155 may be determined based on a power level at which a respective request is transmitted by a UE of the one or more UEs 105*a*-105*n*. For example, a UE of the one or more UEs 105*a*-105*n* may be configured to transmit a first access request having a first power limit of a first power level. In some embodiments, the first power level may be a power level corresponding to EUDs in CBRS. For example, in some embodiments, the first power limit may be an EIRP of 23 dBm/10 MHz.

Accordingly, in some embodiments, the first access request may be transmitted directly to a respective base station 150. For example, in some embodiments, the UE may be configured to generate the first access request following a first access sequence. For example, in one set of embodiments, the first access request may include one or more access attempts. In some embodiments, the UE may be configured to perform an access attempt repeatedly, according to the first access sequence. An access attempt may include, for example, a series of access probes, random access (RA) preamble/request, or other access request signal that is transmitted by the UE. In some embodiments, the UE may make an access attempt until either the base station 150 responds, or the maximum number of attempts have been made. In each access attempt, the UE may be configured to transmit a series of access probe sequences, each separated by a waiting period to allow the base station 150 time to respond. If a response is obtained, then no more access probe sequences are sent. Alternatively, if a maximum number of access probe sequences are sent without a response from the network, the UE may discontinue trying to contact the network/base station 150. In yet further embodiments, each access probe within a respective access probe sequence may be transmitted with increasing power. In some embodiments, initial power levels and maximum power levels may be determined from open loop power control and/or pilot signal strengths received by the UE. In further embodiments, each access request may include one or more access attempts. Accordingly, the first access sequence may include, without limitation, the maximum number of access attempts in an access request, the maximum number of access probe sequences per access attempt, the maximum number of access probes within an access probe sequence, the maximum power level, initial power level, sequence delay between access probes in an access probe sequence, and sequence delay between each respective access probe sequence.

In some further embodiments, the first access request may include an RA procedure. For example, the base station 150 may be a node B, including an eNodeB, configured to broadcast a primary synchronization signal (PSS) and secondary synchronization signal (SSS). The UE may be configured to synchronize with the base station 150 after receiving the PSS and SSS, and reading the master information block (MIB) and physical random access channel (PRACH) configuration information in system information block (SIB2), as known to those skilled in the art. After synchronization, the UE may enter the RA procedure, and be configured to transmit a random access channel (RACH) or PRACH RA preamble sequence. As previously described, the PRACH RA preamble sequence may comprise a series of PRACH RA preambles, in which each of the respective PRACH RA preambles are transmitted with increasing power. Each PRACH RA preamble sequence may be separated by a waiting period to allow the base station 150 time to respond. If a response is obtained, then the UE may be configured to discontinue transmitting the PRACH RA sequences. Similarly, in some examples, if a maximum number of PRACH RA sequences has been sent without a response from the network, the UE may discontinue trying to contact the network/base station 150. In each access attempt, the UE may be configured to transmit a series of access probe sequences, each separated by a waiting period to allow the base station 150 time to respond. In some embodiments, initial power levels and maximum power levels may be determined from open loop power control and/or pilot signal strengths received by the UE, such as from information read from SIB2.

In some embodiments, the UE may be configured to follow a level ramping scheme. The level ramping scheme may include, for example, PRACH coverage enhancement (CE) level ramping. For example, after unsuccessful attempts at a first PRACH CE level, the UE may be configured to increase to the next PRACH CE level (and increases the number of PRACH repetitions per attempt). For example, in some embodiments, the base station 150 may be configured to operate in two or more operational modes. The operational modes may include, without limitation, CE modes, as known to those skilled in the art. Each of the operational modes of the base station 150 may include two or more levels. The two or more levels may include, for example, two or more CE levels. Each CE level may determine the number of repetitions, and in some examples, a power level at which an RA preamble is transmitted by the UE. In some embodiments, the CE level may be determined based on a reference signal power (RSRP) measured by the UE. Accordingly, in various embodiments, two or more RSRP thresholds may be utilized corresponding to two or more CE levels. In some examples, above a first RSRP threshold, the UE may be configured to operate at a CE first level. Below the first RSRP threshold, but above a second RSRP threshold, the UE may be configured to operate at a second CE level. Each of the first and second level may be associated with a first operational mode of the base station 150.

When the reference signal is below the second RSRP threshold but above a third RSRP threshold, the UE may be configured to operate at a third CE level, and below the third RSRP threshold, the UE may be configured to operate at a fourth CE level. The third and fourth CE level may correspond to a second operational mode of the base station 150. In some embodiments, at the first CE level, the UE may be configured to make no repetitions for PRACH RA preamble transmission. At the second CE level, the UE may be configured to make one or more repetitions for PRACH RA preamble transmission, but less than the number of transmissions made at the third CE level. At the third CE level, the UE may be configured to make two or more repetitions of a PRACH RA preamble transmission, more than the number of transmissions made at the second CE level, but less than the number of transmissions made at the fourth CE level. At the fourth CE level, the UE may be configured to make three or more repetitions of a PRACH RA preamble transmission that is more than the number of transmissions made at the third CE level.

In various embodiments, the RSRP thresholds may be determined to be below a max EIRP associated with end user devices in CBRS. For example, in some embodiments, the maximum RSRP threshold may correspond to a reference signal broadcast at a power level up to the 23 dBm/10 MHz EIRP associated with end user devices in CBRS. In further embodiments, access requests, such as access probes, PRACH/RACH RA preambles, or other access request signals, may be transmitted up to a maximum power level corresponding to the 23 dBm/10 MHz EIRP. Thus, up to and below the 23 dBm/10 MHz EIRP, the first access request may be transmitted according to an LTE or LTE-m random access procedure. In other embodiments, the UE may be configured to perform an access probe sequence, for example, as used in CDMA networks. In yet further embodiments, a combination of an LTE random access procedure and an access probe sequence may be performed.

In various embodiments, above a power level of 23 dBm/10 MHz EIRP, the UE may be configured to operate according to CBRS access procedures. For example, in some embodiments, a respective UE of the one or more UEs 105*a*-105*n* may be configured to register with the SAS 145. For example, in various embodiments, the base station 150 may be configured to provide an access response responsive to receiving an access request from a respective UE of the one or more UEs 105*a*. If no access response is received by the UE, the UE may be configured to enter into SAS communications, in which the UE may communicate at higher power levels in CBRS.

Accordingly, when no access response is received to the first access request, the UE may be configured to generate a second access request. In the second access request, the UE may be configured to register with the SAS 145. The SAS 145 may be configured to determine whether and at what power level the UE may communicate in the CBRS spectrum, and to authorize the UE to communicate with the base station 150 at the determined power level.

In various embodiments, the UE may be configured to register with the SAS. SAS registration may include, for example, CBSD registration, as known to those skilled in the art. In some examples, CBSDs may include the one or more UEs 105*a*-105*n*. A UE of the one or more UEs 105*a*-105*n* may be configured to discover the SAS 145. In some embodiments, a UE, such as UE 105*n*, may be coupled to a domain proxy 125. Accordingly, in some embodiments, the domain proxy 125 may be configured to discover the SAS 145. In various embodiments, the one or more UEs 105*a*-105*n* and/or domain proxy 125 may be configured to connect to the SAS 145 via a uniform resource locator (URL). Accordingly, the SAS 145 URL may be provisioned to each of the one or more UEs 105*a*-105*n* and/or domain proxy 125. For example, in some embodiments, the one or more UEs 105*a*-105*n* and/or domain proxy 125 may be pre-provisioned with a URL of the SAS 145, programmed by with the URL of the SAS 145 once deployed, or receive a broadcast of the URL of the SAS 145 from the SAS 145 itself.

In various embodiments, once the SAS 145 has been discovered, the one or more UEs 105*a*-105*n* and/or domain proxy 125 may register with the SAS 145. Registration with the SAS 145 may include, for example, mutual authentication between the one or more UEs 105*a*-105*n* and/or domain proxy 125 and the SAS 145. For example, the one or more UEs 105*a*-105*n* and/or domain proxy 125 may be configured to provide device identity and/or user identity information to the SAS 145. If the device (e.g., the one or more UEs 105*a*-105*n* and/or domain proxy 125) and/or user is successfully authenticated, the one or more UEs 105*a*-105*n* and/or domain proxy 125 may be registered with the SAS 145. The one or more UEs 105*a*-105*n* and/or domain proxy 125 may further be configured to indicate to the SAS a device category and/or group membership, indicative of a power level at which the one or more UEs 105*a*-105*n* and/or domain proxy 125 may communicate. Once the SAS registration procedure has been completed, the SAS 145 may be configured to provide a response indicative of whether the one or more UEs 105*a*-105*n* and/or domain proxy 125 has successfully been registered.

Once the one or more UEs 105*a*-105*n* and/or domain proxy 125 has been successfully registered, in various embodiments, the one or more UEs 105*a*-105*n* and/or domain proxy 125 may be configured to initiate requests for spectrum. A request for spectrum, for example, may include a CBSD spectrum inquiry. In various embodiments, the one or more UEs 105*a*-105*n* and/or domain proxy 125 may initiate a spectrum inquiry request. The spectrum inquiry request may include one or more frequency ranges for which the one or more UEs 105*a*-105*n* and/or domain proxy 125 may request information. Thus, the one or more UEs 105*a*-105*n* and/or domain proxy 125 may request information regarding the one or more frequency ranges. The SAS 145 may, in turn, assess spectrum availability for each of the one or more frequency ranges requested in the spectrum inquiry request. The SAS 145 may, accordingly, be configured to provide a spectrum inquiry response indicative of information (e.g., availability) of each of the one or more frequency ranges requested in the spectrum inquiry request.

In various embodiments, the one or more UEs 105*a*-105*n* and/or domain proxy 125 may be configured to initiate a spectrum grant request, in which access to a frequency range is requested by the UE. In some embodiments, the one or more UEs 105*a*-105*n* and/or domain proxy 125 may be configured to request access to a frequency range determined to be available based on the spectrum inquiry response. Accordingly, the one or more UEs 105*a*-105*n* and/or domain proxy 125 may be configured to determine operational parameters to be included in the spectrum grant request. Operational parameters may include, without limitation, frequency range and/or maximum EIRP of the CBSD, in this case the one or more UEs 105*a*-105*n* and/or domain proxy 125 to be used. Accordingly, in various embodiments, the one or more UEs 105*a*-105*n* and/or domain proxy 125 may initiate the spectrum grant request to the SAS 145. The SAS 145 may be configured to determine if the operational parameters in the spectrum grant request are acceptable. For example, the SAS 145 may be configured to determine whether the requested frequency range is available, and whether the one or more UEs 105*a*-105*n* and/or domain proxy 125 may transmit signals at the requested maximum EIRP. In various embodiments, the SAS 145 may be configured to generate a spectrum grant response configured to be responsive to the spectrum grant request. If it is determined that the operational parameters are acceptable, the SAS 145 may accept the spectrum grant request, and provide a spectrum grant response configured to indicate that the spectrum grant request has been accepted and includes one or more of a grant identifier, a grant expiration time, and heartbeat interval. If it is determined that the operational parameters are not acceptable, the SAS 145 may deny the spectrum grant request, and provide a spectrum grant response configured to indicate that the spectrum grant request has been denied, and suggest operational parameters to be used by the one or more UEs 105*a*-105*n* and/or domain proxy 125. In embodiments, the one or more UEs 105*a*-105*n* and/or domain proxy 125 may then generate a new spectrum grant request based on the suggested operational parameters. In some embodiments, the one or more UEs 105*a*-105*n* and/or domain proxy 125 may further be configured to request a spectrum grant renewal via a heartbeat request, as will be described below. The one or more UEs 105*a*-105*n* and/or domain proxy 125 may be configured to cease transmission on the associated frequency range upon expiration of the grant.

In various embodiments, the one or more UEs 105*a*-105*n* and/or domain proxy 125 may be unable to utilize the granted frequency range until a heartbeat procedure has been completed. Accordingly, in response to receiving the spectrum grant response, the one or more UEs 105*a*-105*n* and/or domain proxy 125 may be configured to initiate the heartbeat procedure. The heartbeat procedure, for example, may include a CBSD heartbeat procedure. The heartbeat procedure may include periodically requesting authorization, from the SAS 145, to continue using the granted spectrum. Accordingly, the SAS 145 may be configured to determine whether to suspend or terminate a spectrum grant responsive to the heartbeat procedure. In some embodiments, the one or more UEs 105*a*-105*n* and/or domain proxy 125 may be configured to transmit a heartbeat request according to a heartbeat timer, set by the SAS 145. For example, to continue using a granted spectrum, the one or more UEs 105*a*-105*n* and/or domain proxy 125 may be configured to generate a heartbeat request any time prior to expiration of the timer. The one or more UEs 105*a*-105*n* and/or domain proxy 125 may, thus, be configured to transmit the heartbeat request to the SAS 145, which may in turn provide a heartbeat response. The heartbeat response may cause the one or more UEs 105*a*-105*n* and/or domain proxy 125 to suspend or terminate use of the granted spectrum by revoking the spectrum grant. Alternatively, a heartbeat response may be provided indicating that the one or more UEs 105*a*-105*n* and/or domain proxy 125 may continue using the spectrum grant.

Once the spectrum grant has been provided, the one or more UEs 105*a*-105*n* and/or domain proxy 125 may be configured to transmit a network access request via a respective CBRS base station 150. In some embodiments, a level ramping access scheme may be implemented, as previously described, in which access to the network 155, via the base station 150, may be requested.

In response to a determination that the spectrum grant has been revoked, whether through a heartbeat response, expiration of the spectrum grant, or a determination that the spectrum grant is no longer needed, the one or more UEs 105*a*-105*n* and/or domain proxy 125 may be configured to relinquish the grant. If the one or more UEs 105*a*-105*n* and/or domain proxy 125 has initiated the relinquishment procedure, the SAS 145 may be configured to revoke the spectrum grant to the respective one or more UEs 105*a*-105*n* and/or domain proxy 125. If the one or more UEs 105*a*-105*n* and/or domain proxy 125 requires access to the spectrum, a new spectrum grant request procedure may be initiated by the respective CBSD (e.g., the one or more UEs 105*a*-105*n* and/or domain proxy 125). In some embodiments, the one or more UEs 105*a*-105*n* and/or domain proxy 125 may not invoke a grant relinquishment procedure for a spectrum grant that has expired.

Accordingly, in various embodiments, depending on the power level at which the one or more UEs 105*a*-105*n* and/or domain proxy 125 may be configured to request access to the network 155 via the base station 150 as previously described, or to obtain a spectrum grant, via the SAS 145, to transmit a network access request to the base station 150.

Figure 2:
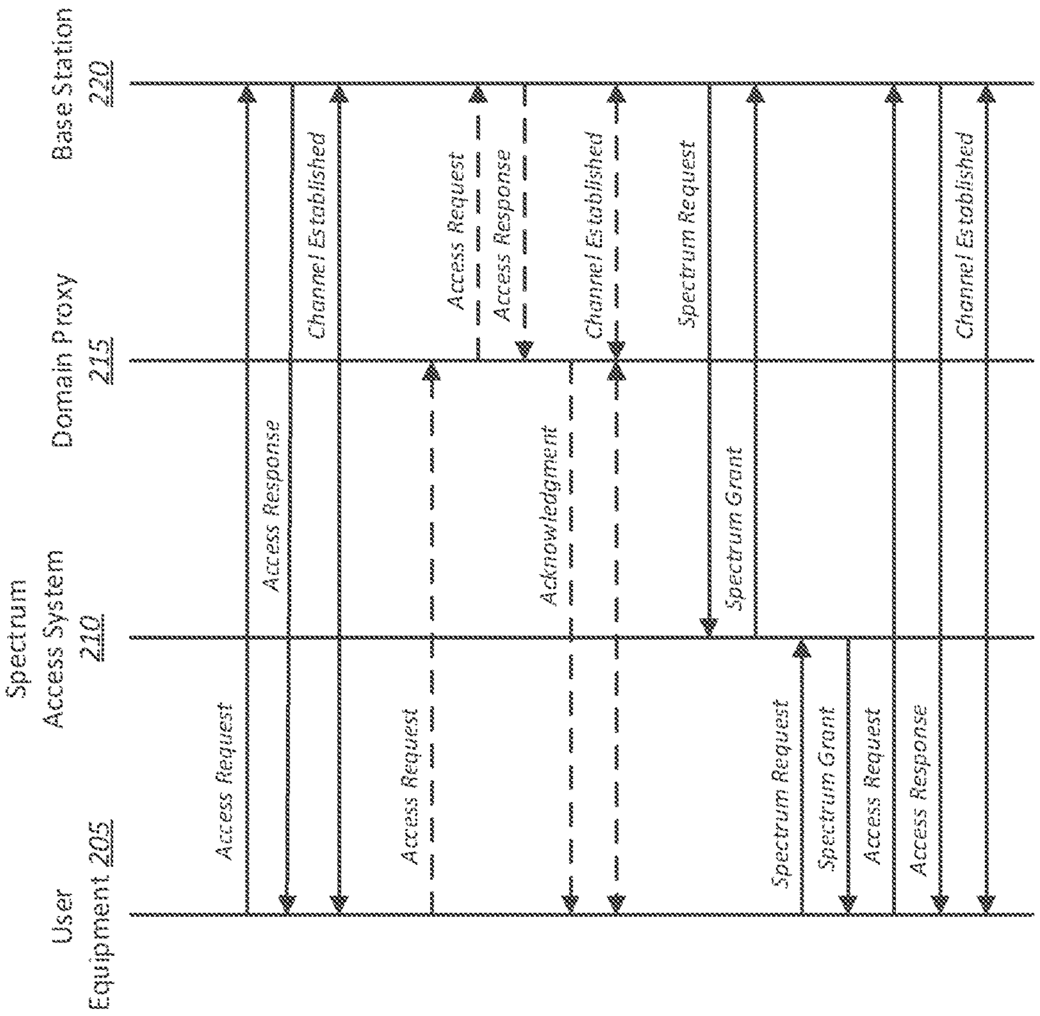
FIG. 2 is a sequence diagram of a hybrid SAS and access probe network access framework, in accordance with various embodiments.

FIG. 2 is a sequence diagram 200 of a hybrid SAS and access probe network access framework, in accordance with various embodiments. The sequence diagram 200 includes UE 205, SAS 210, domain proxy 215, and base station 220. It should be noted that the various components of the sequence diagram 200 are schematically illustrated in FIG. 2, and that modifications to the sequence diagram may be possible in accordance with various embodiments.

In various embodiments, the UE 205 may be configured to initiate a network access request with the base station 220. As previously described, in some embodiments, the UE 205 may transmit a first access request at a first power level having a first power limit. The first power limit may correspond to EUDs in CBRS. For example, the first power limit may be a maximum EIRP of 23 dBm/10 MHz. Thus, the UE 205 may, in some embodiments, first attempt to initiate the first access request directly with the base station 220. In some embodiments, the first access request may include a one or more access attempts. Each of the one or more access attempts may include a series of access probes, RA requests, or other access request signal transmitted by the UE 205. As previously described, in some embodiments, the UE 205 may be configured to transmit each access probe within a respective access probe sequence may be transmitted with increasing power. For example, the UE 205 may be configured to transmit a series of access probe sequences, each separated by a waiting period to allow the base station 220 time to respond. If an access response is obtained from the base station 220, or if a maximum number of access probe sequences has been sent without a response, then no more access probe sequences are sent.

The UE 205 may be configured to transmit each access probe within a respective access probe sequence may be transmitted with increasing power, up to the first power limit. In some further embodiments, the UE 205 may be configured to implement a level ramping scheme. For example, a CE level may determine the number of repetitions of a RA preamble to be made by the UE 205. In some embodiments, the CE level may be determined based on a RSRP measured by the UE. Accordingly, in various embodiments, two or more RSRP thresholds may be utilized corresponding to two or more CE levels. In some examples, above a first RSRP threshold, the UE 205 may be configured to operate at a CE first level. Below the first RSRP threshold, but above a second RSRP threshold, the UE 205 may be configured to operate at a second CE level. Each of the first and second level may be associated with a first operational mode of the base station 220. Below the second RSRP threshold but above a third RSRP threshold, the UE 205 may be configured to operate at a third CE level, and below the third RSRP threshold, the UE 205 may be configured to operate at a fourth CE level. The third and fourth CE level may correspond to a second operational mode of the base station 220.

In various embodiments, in response to receiving the network access request from the UE 205, the base station 220 may provide a network access response. The network access response may indicate, to a respective UE 205, whether access to the network has been granted to denied. Once access has been granted, via the network access response, a communication channel may be established between the base station 220 and the UE 205, via which the UE 205 may communicate over a communication network associated with the base station 220.

In some alternative embodiments, the UE 205 may be configured to be coupled to the base station 220 via a domain proxy 215. Accordingly, the UE 205 may be coupled to a domain proxy 215. In some embodiments, the UE 205 may be configured to register with a domain proxy 215, and transmit an access request to the domain proxy 215. The domain proxy 215 may, in turn, transmit the access request to the base station 220 based on the access request received from the UE 205. The base station 220 may, in turn, be configured to provide an access response to the domain proxy 215, which may in turn transmit an acknowledgment to the UE 205, indicative of the access response received from the base station 220. In response, a communication may be established between the domain proxy 215 and the base station 220, and the domain proxy 215 and the UE 205, over which the UE 205 may communicate. Accordingly, as previously described, in this example the domain proxy 215 may initiate an access request following an access sequence and/or level ramping.

If no response is received from the base station 220 in response to the first access request, the UE 205 may be configured to transmit a second access request at a second power level. The second power level may be configured to correspond to a CBSD power level for category A devices. For example, category A devices may have a maximum EIRP of 30 dBm/10 MHz. Thus, in some embodiments, the second access request may be transmitted at a power level between 23 and 30 dBm/10 Mhz inclusively and/or exclusive of either of the power limits.

Accordingly, when the UE 205 is configured to transmit the second access request at a power level for category A devices in CBRS, the UE 205 may be configured to first register with an SAS 210. As previously described, the SAS 210 may be configured to register the UE 205, provide information about spectrum availability, and grant or deny access to parts of the CBRS spectrum. Similarly, a base station 220 may also be configured to register with the SAS 210, for example, as a category B CBSD.

Accordingly, in various embodiments, the base station 220 may be configured to register with the SAS 210, and to transmit a spectrum access request to the SAS 210. The SAS 210 may, in turn, be configured to determine whether a requests frequency range is available. If it is determined that the requested frequency range is not available, the SAS 210 may provide a spectrum access response denying the spectrum access request. If it is determined that the requested frequency range is available, the SAS 210 may provide a spectrum access response granting the spectrum access request.

Similarly, the UE 205 may be configured to register with the SAS 210, and to transmit a spectrum access request to the SAS 210. The SAS 210 may, in turn, be configured to determine whether a requests frequency range is available. If it is determined that the requested frequency range is not available, the SAS 210 may provide a spectrum access response denying the spectrum access request. If it is determined that the requested frequency range is available, the SAS 210 may provide a spectrum access response granting the spectrum access request.

Once the spectrum access request has been granted, the UE 205 may be authorized to transmit a second access request at the second power level, for example, up to a maximum EIRP of 30 dBm/10 MHz. Thus, the UE 205 may be configured to transmit the second access request to the base station 220. In some embodiments, as described with respect to the first access request, the UE 205 may be configured to transmit one or more access probes, one or more RA preambles, or other access request signals, as part of the second access request. Each of the one or more access probes and/or RA preambles may be transmitted with increasing power. For example, in some embodiments, the one or more access probes and/or RA preambles may be transmitted from 23 dBm/10 MHz to the maximum of 30 dBm/10 MHz. In further embodiments, the UE 205 may be configured to further implement level ramping, as previously described, in which the number of repetitions of access attempts within the second access request may be increased accordingly to CE level. In response to receiving the access request, the base station 220 may be configured to provide a network access response, granting and/or denying access to the communication network.

Figure 3A:
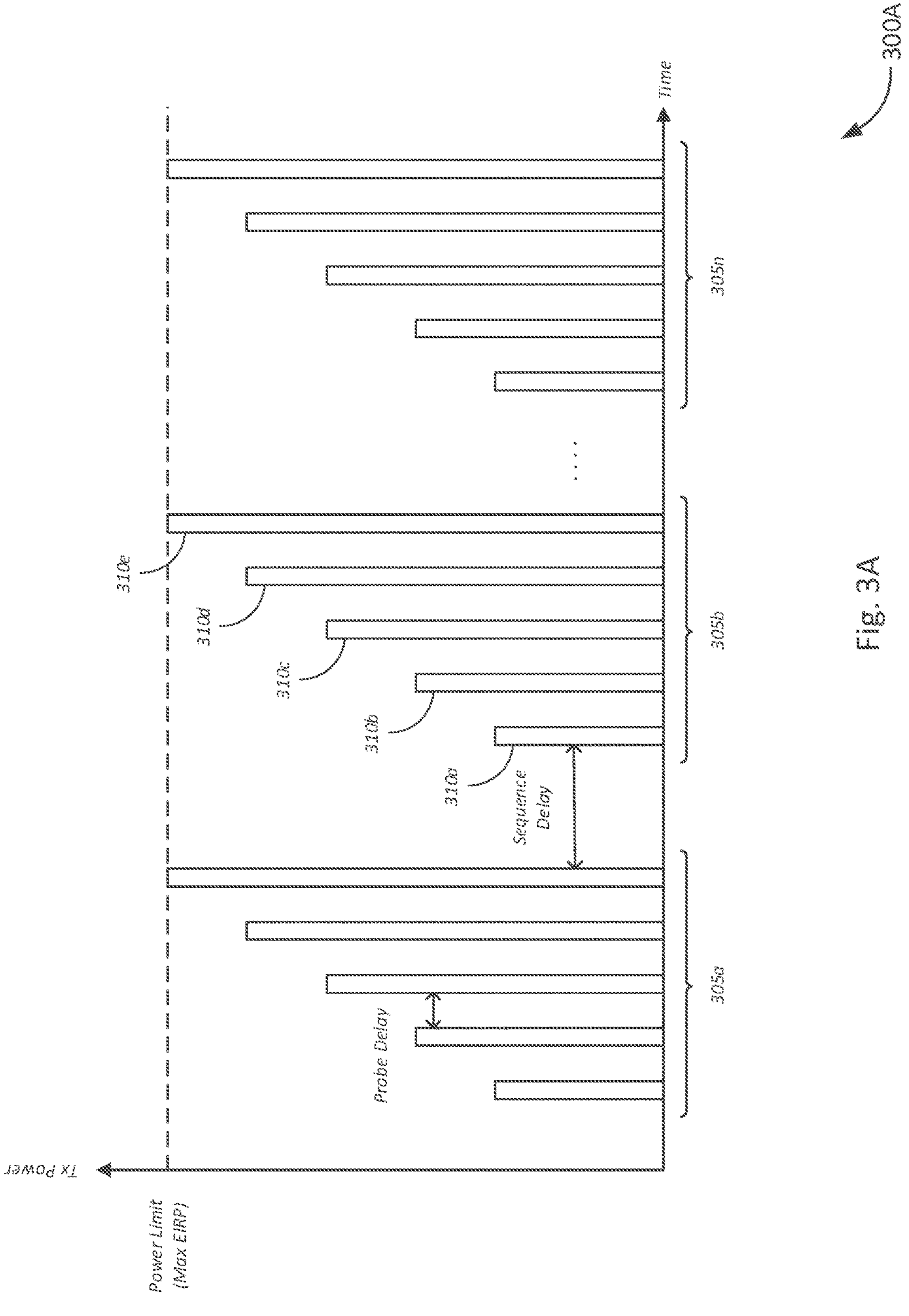
FIG. 3A is a schematic diagram of a ramping access probe signal according to the hybrid SAS and access probe network access framework, in accordance with various embodiments.
Figure 3B:
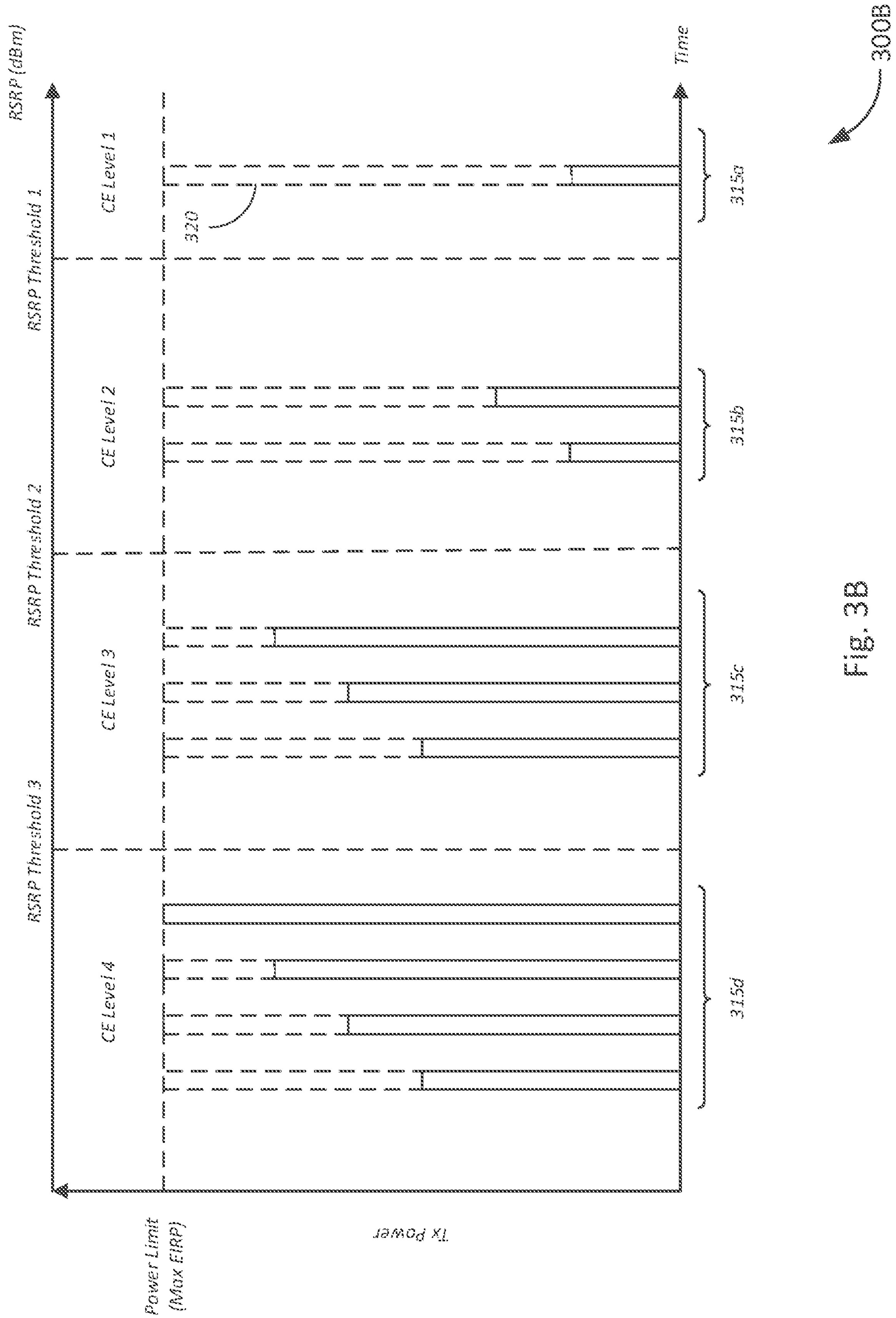
FIG. 3B is a schematic diagram of a level ramping of a random access preamble signal according to the hybrid SAS and access probe network access framework, in accordance with various embodiments.

Various access schemes are described in greater detail below with respect to FIGS. 3A & 3B. In various embodiments, the access schemes depicted in FIGS. 3A & 3B may be implemented by either the UE and/or a domain proxy, as applicable. FIG. 3A is a schematic diagram of a ramping access probe signal in an access request 300A according to the hybrid SAS and access probe network access framework, in accordance with various embodiments. The access request 300A may include one or more access attempts, such as the one or more access probe sequences 305*a*-305*n*. Each of the access probe sequences 305*a*-305*n* may include one or more access probes 310*a*-310*e*. It should be noted that the various signals of the access request 300A are schematically illustrated in FIG. 3A, and that modifications to the signals of the access request 300A may be possible in accordance with various embodiments.

As previously described, each access attempt of an access request may include a sequence of access probes, RA preambles, or other access request signals. In the embodiments depicted, the access attempts comprise one or more access probe sequences 305*a*-305*n*. Each of the access probe sequences 305*a*-305*n* may be separated by a sequence delay. The sequence delay may be an amount of time each respective access probe sequence from a subsequent access probe sequence. For example, after transmitting a first access probe sequence 305*a*, the UE may be configured to wait for the expiration of the sequence delay before transmitting a second access probe sequence 305*b*.

In various embodiments, each of the access probe sequences 305*a*-305*n* may include a series of access probes 310*a*-310*e*. Each respective access probe 310*a*-310*d* may be separated from a respective subsequent access probe 310*b*-310*e* by a probe delay. For example, after transmitting the first access probe 310*a*, the UE may be configured to wait for the duration of the probe delay before transmitting a second access probe 310*b*. Each of the subsequent access probe 310*c*-310*e* may be transmitted after a respective probe delay has elapsed.

Furthermore, as previously described, the UE may be configured to transmit each access probe 310*a*-310*e* of a respective access sequence 305*a*-305*n* with increasing power. For example, a first access probe 310*a* may be transmitted at a first power level, which may be lower than a second power level at which the second access probe 310*b* may be transmitted. The third power level at which the third access probe 310*c* is transmitted may be higher than the second power level, but lower than a fourth power level at which the fourth access probe 310*d* is transmitted. A fifth access probe 310*e* may be transmitted at a fifth power level, which may correspond to a power limit at which the access request 300A is transmitted.

As previously described, in some embodiments, the power limit may correspond to a CBSD power level of EUDs. In some examples, the power limit may correspond to a maximum EIRP of 23 dBm/10 MHz. Thus, in various embodiments, the fifth access probe 310*e* may be transmitted at a power level less than or equal to the power limit.

While operating at or below the power limit, the UE may be configured to transmit the access request directly to a base station. In some embodiments, if a response is received from the base station, the UE may be configured to cease transmitting the access probe sequences 305*a*-305*n*. In further embodiments, if no response is received from the base station, the UE may be configured to cease transmitting the access probe sequences 305*a*-305*n* after a maximum number (e.g., an n-number) of access attempts have been made. As previously described, if after the maximum number of access attempts no response has been received, the UE may be configured to request spectrum access from a respective SAS.

Once spectrum access has been received, in some embodiments, the UE may be configured to transmit an access request 300A in the granted CBRS spectrum. Accordingly, in some embodiments, the access request 300A may be a second access request, transmitted above a corresponding maximum EIRP of 23 dBm/10 MHz, after the UE has ceased the first access request. Accordingly, in some embodiments, the second access request may similarly include a sequence of access probes 305*a*-305*n*. In this example, the power limit may correspond to a maximum EIRP for category A CBSDs. Thus, in some embodiments, the power limit may be a maximum EIRP of 30 dBm/10 MHz.

In some further embodiments, the UE may further be configured to implement level ramping in access requests at power levels corresponding to EUDs and/or Category A CBSDs. FIG. 3B is a schematic diagram of level ramping of an access request 300B, according to the hybrid SAS and access probe network access framework. The access request 300B may include one or more RA preamble sequences, including a first RA preamble sequence 315*a*, second RA preamble sequence 315*b*, third RA preamble sequence 315*c*, and fourth RA preamble sequence 315*d*. Each of the RA preamble sequences 315*a*-315*d* may comprise one or more RA preambles 320. It should be noted that the various signals of the access request 300B are schematically illustrated in FIG. 3B, and that modifications to the signals of the access request 300B may be possible in accordance with various embodiments.

In various embodiments, the access request 300B may be configured to follow a level ramping procedure, based on an RSRP threshold measured by the UE. It should be understood that although each RA preamble sequence 315*a*-315*d* are depicted in sequence along the time axis, each RA preamble sequence 315*a*-315*d* should be considered independently with respect to time. That is, the fourth RA preamble sequence 315*d* is not necessarily transmitted first, before RA preamble sequences 315*a*-315*c*, and similarly, the first preamble sequence is not transmitted last after RA preamble sequences 315*b*-315*d*.

As previously described, the RSRP may be the measured power level of a received reference signal from a base station. In some embodiments, the RSRP thresholds may be indicative of proximity to the base station transmitting the reference signal. For example, the closer that a UE is to a base station, such as a category B CBSD or other suitable CBRS base station, the RSRP may be measured to be higher. Conversely, when a UE is farther away from a base station, the RSRP may be measured to be lower.

Accordingly, when RSRP exceeds the RSRP threshold 1, the UE may be configured to operate at a first CE level (CE level 1). In some embodiments, because an RSRP exceeding RSRP threshold 1 may correspond to close proximity to the base station, in some examples, the UE operating in CE level 1 may be configured to transmit the RA preamble sequence 315*a* with no repetitions. Accordingly, in some embodiments, the first RA preamble sequence 315*a* may include one RA preamble 320. In further embodiments, in CE level 1, the UE may be configured to transmit the RA preamble at a lower power level. For example, due to the close proximity to the base station, the UE may be configured to save power by transmitting the RA preamble 320 at a lower power level. In other embodiments, the RA preamble 320 may be transmitted at a power level less than or equal to the power limit, which may correspond to a maximum EIRP for EUDs (e.g., 23 dBm/10 MHz) and/or category A CBSDs (e.g., 30 dBm/10 MHz), depending on whether a first access request with a power limit of 23 dBm/10 Mhz is being transmitted, or a second access request is being transmitted at a power greater than 23 dBm/10 MHz but less than the power limit of 30 dBm/10 MHz.

If RSRP exceeds a second RSRP threshold (RSRP threshold 2), but is lower than RSRP threshold 1, the UE may be configured to operate at a second CE level (CE level 2). At CE level 2, the UE may be configured to transmit a second RA preamble sequence 315*b*. The second RA preamble sequence 315*b*, in this example, may include two repetitions of the RA preamble 320. As previously described, in some embodiments, each of the RA preambles 320 of the second RA preamble sequence 315*b* may be transmitted with increasing power. The UE may further be configured to transmit each of the RA preambles 320 of the second RA preamble sequence 315*b* at a power level less than or equal to the power limit.

If RSRP exceeds a third RSRP threshold (RSRP threshold 3), but is lower than RSRP threshold 2, the UE may be configured to operate at a third CE level (CE level 3). At CE level 3, the UE may be configured to transmit a third RA preamble sequence 315*c*. The third RA preamble sequence 315*c*, in this example, may include three repetitions of the RA preamble 320. As previously described, in some embodiments, each of the RA preambles 320 of the third RA preamble sequence 315*c* may be transmitted with increasing power. The UE may further be configured to transmit each of the RA preambles 320 of the third RA preamble sequence 315*c* at a power level less than or equal to the power limit.

Similarly, if RSRP is lower than RSRP threshold 3, the UE may be configured to operate at a fourth CE level (CE level 4). At CE level 4, the UE may be configured to transmit a fourth RA preamble sequence 315*d*, which may include four repetitions of the RA preamble 320. As previously described, in some embodiments, each of the RA preambles 320 may be transmitted with increasing power, up to the power limit. In other embodiments, as an RSRP lower than RSRP threshold 3 may be indicative of distance from the base station, the UE may be configured to transmit a stronger RA preamble signal. Accordingly, in some examples, the UE may transmit the fourth RA preamble sequence 315*d* at power level corresponding to the maximum EIRP for EUDs (e.g., 23 dBm/10 MHz) and/or category A CBSDs (e.g., 30 dBm/10 MHz), as applicable.

Figure 4:
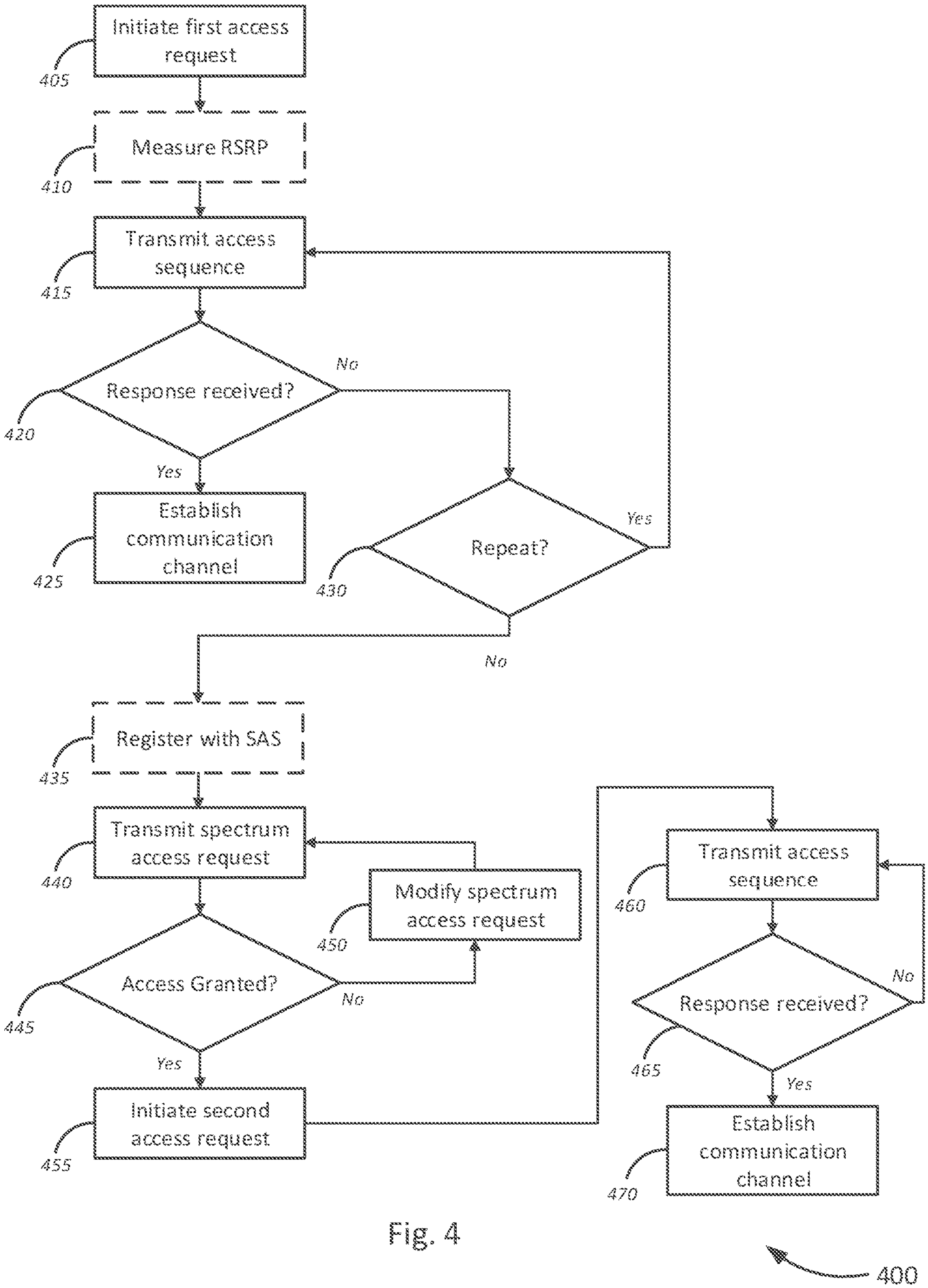
FIG. 4 is a flow diagram of a method for a hybrid SAS and access probe network access framework, in accordance with various embodiments.

FIG. 4 is a flow diagram of a method 400 for a hybrid SAS and access probe network access framework. The method 400 begins, at block 405, by initiating a first access request. For example, as previously described, the UE and/or a domain proxy may initiate a first access request by making a series of access attempts. Each access attempt may include a sequence of access probes, RA preambles, and/or other suitable access request signals. In various embodiments, the UE and/or a domain proxy, may be configured to initiate a first access request with a respective base station. In some embodiments, initiating a first access request may include generating and transmitting the first access request to the base station. In some examples, the first access request may include signals transmitted at a power level up to a power limit. In some embodiments, the power limit may include, without limitation, a power level associated with EUDs in CBRS (e.g., a maximum EIRP of 23 dBm/10 MHz).

The method 400 may continue, at block 410, by measuring an RSRP. In various embodiments, the RSRP may be a measured signal strength of a reference signal transmitted by a base station. As previously described, in some embodiments, the UE may be configured to implement a level ramping scheme, which a CE level is determined based on an RSRP. Therefore, in various embodiments, the UE may be configured to measure an RSRP of a reference signal.

The method 400 continues, at block 415, by transmitting an access sequence 415. As previously described, the first access request may include one or more access sequences. Access sequences may include, without limitation, a sequence of access probes, RA preambles, or other suitable access request signal. As previously described, in various embodiments, an access sequence may be transmitted by the UE and/or domain proxy, in which each access request signal (e.g., access probe and/or RA preamble) is transmitted with increasing power. In further embodiments, the UE and/or domain proxy may be configured to implement level ramping, in which a CE level may be determined based on the RSRP. The CE level may determine a number of repetitions made for each access request signal in an access sequence.

At decision block 420, it is determined whether a response has been received from the base station. If a network access response indicating network access has been granted is received, the method 400, at block 425, may continue by establishing a communication channel between the UE and/or domain proxy, and the base station.

If no response has been received from the base station, or a response has been received denying network access, the method 400 may continue, at decision block 430, by determining whether to repeat transmitting the access sequence. As previously described, in various embodiments, the UE and/or domain proxy may be configured to cease transmitting the access sequence after a maximum number of access attempts have been made, or if a response has already been received. Thus, if a maximum number of access attempts have not yet been made, it may be determined to repeat transmission of the access sequence. In some embodiments, repetition of the access sequence may further include following a level ramping scheme, in which subsequent access sequences may be transmitted with a greater number of access request signals.

If it is determined that the access sequence should not be transmitted again, the UE and/or domain proxy may be configured to request access to the CBRS spectrum. Accordingly, the method 400 may continue, at block 435, by registering with an SAS. The method 400 may continue, at block 440, by transmitting a spectrum access request to the SAS. At decision block 445, it is determined whether access has been granted to the spectrum by the SAS. If it is determined that spectrum access has not been granted, the spectrum access request may be modified based on a spectrum access response from the SAS.

If it is determined that spectrum access has been granted, the method 400 may continue, at block 455, by initiating a second access request. As previously described, initiating the second access request may include generating and transmitting the second access request to a corresponding base station. The second access request may include signals that may be transmitted at a power level up to a power limit. The power limit of the second access request may include, without limitation, a power level associated with category A CBSDs (e.g., a maximum EIRP of 30 dBm/10 MHz).

The method 400 may continue, at block 460, by transmitting an access sequence of the second access request. As previously described, the access sequence may include, without limitation, a sequence of access probes, RA preambles, or other suitable access request signals. As previously described, in various embodiments, an access sequence may be transmitted by the UE and/or domain proxy, in which each access request signal (e.g., access probe and/or RA preamble) is transmitted with increasing power. In further embodiments, the UE and/or domain proxy may be configured to implement level ramping, in which a CE level may be determined based on the RSRP. The CE level may determine a number of repetitions made for each access request signal in an access sequence. In this case, power levels with which the access request signal are transmitted may exceed the power limit associated with the first access request (e.g., greater than 23 dBm/10 MHz), but be less than the power limit of the second access request (e.g., 30 dBm/10 MHz).

At decision block 465, it is determined whether a response has been received from the base station. If no response has been received, or if a response has been received denying access to the network, the method 400 continues, at block 460, by transmitting the access sequence again. At block 470, if a response has been received granting access to the network, a communication channel may be established between the base station and the UE and/or domain proxy.

Figure 5:
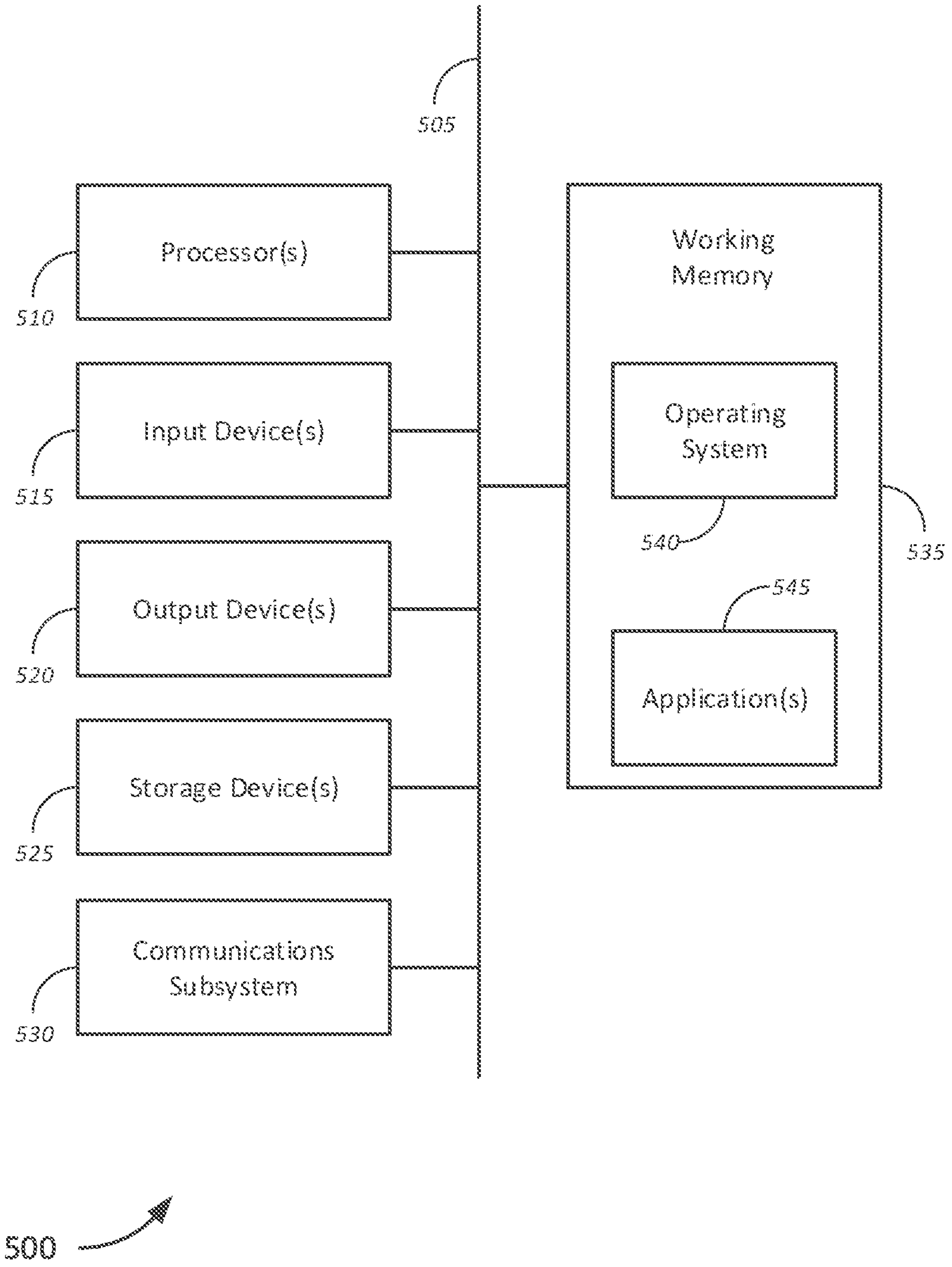
FIG. 5 is a schematic block diagram of a computer system for a hybrid SAS and access probe network access framework, in accordance with various embodiments.

FIG. 5 is a schematic block diagram of a computer system 500 for a hybrid SAS and access probe network access framework, in accordance with various embodiments. The computer system 500 is a schematic illustration of a computer system (physical and/or virtual), such as a UE, domain proxy, SAS, base station controller, or other systems, which may perform the methods provided by various other embodiments, as described herein. It should be noted that FIG. 5 only provides a generalized illustration of various components, of which one or more of each may be utilized as appropriate. FIG. 5, therefore, broadly illustrates how individual system elements may be implemented in a relatively separated or relatively more integrated manner.

The computer system 500 includes multiple hardware (or virtualized) elements that may be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and microcontrollers); one or more input devices 515, which include, without limitation, a mouse, a keyboard, one or more sensors, and/or the like; and one or more output devices 520, which can include, without limitation, a display device, and/or the like.

The computer system 500 may further include (and/or be in communication with) one or more storage devices 525, which can comprise, without limitation, local and/or network accessible storage, and/or can include, without limitation, a disk drive, a drive array, an optical storage device, solid-state storage device such as a random-access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer system 500 may also include a communications subsystem 530, which may include, without limitation, a modem, a network card (wireless or wired), an IR communication device, a wireless communication device and/or chipset (such as a Bluetooth™ device, an 802.11 device, a WiFi device, a WiMax device, a WWAN device, a low-power (LP) wireless device, a Z-Wave device, a ZigBee device, cellular communication facilities, etc.). The communications subsystem 530 may permit data to be exchanged with a network (such as the network described below, to name one example), with other computer or hardware systems, between data centers or different cloud platforms, and/or with any other devices described herein. In many embodiments, the computer system 500 further comprises a working memory 535, which can include a RAM or ROM device, as described above.

The computer system 500 also may comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code may be encoded and/or stored on a non-transitory computer readable storage medium, such as the storage device(s) 525 described above. In some cases, the storage medium may be incorporated within a computer system, such as the system 500. In other embodiments, the storage medium may be separate from a computer system (i.e., a removable medium, such as a compact disc, etc.), and/or provided in an installation package, such that the storage medium can be used to program, configure, and/or adapt a general purpose computer with the instructions/code stored thereon. These instructions may take the form of executable code, which is executable by the computer system 500 and/or may take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, single board computers, FPGAs, ASICs, and SoCs) may also be used, and/or particular elements may be implemented in hardware, software (including portable software, such as applets, etc.), or both. Further, connection to other computing devices such as network input/output devices may be employed.

As mentioned above, in one aspect, some embodiments may employ a computer or hardware system (such as the computer system 500) to perform methods in accordance with various embodiments of the invention. According to a set of embodiments, some or all of the procedures of such methods are performed by the computer system 500 in response to processor 510 executing one or more sequences of one or more instructions (which may be incorporated into the operating system 540 and/or other code, such as an application program 545 or firmware) contained in the working memory 535. Such instructions may be read into the working memory 535 from another computer readable medium, such as one or more of the storage device(s) 525. Merely by way of example, execution of the sequences of instructions contained in the working memory 535 may cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer system 500, various computer readable media may be involved in providing instructions/code to processor(s) 510 for execution and/or may be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including, without limitation, radio, acoustic, and/or light waves, such as those generated during radio-wave and infrared data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer may load the instructions into its dynamic memory and send the instructions as signals over a transmission medium to be received and/or executed by the computer system 500. These signals, which may be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally receives the signals, and the bus 505 then may carry the signals (and/or the data, instructions, etc. carried by the signals) to the working memory 535, from which the processor(s) 510 retrieves and executes the instructions. The instructions received by the working memory 535 may optionally be stored on a storage device 525 either before or after execution by the processor(s) 510.

Figure 6:
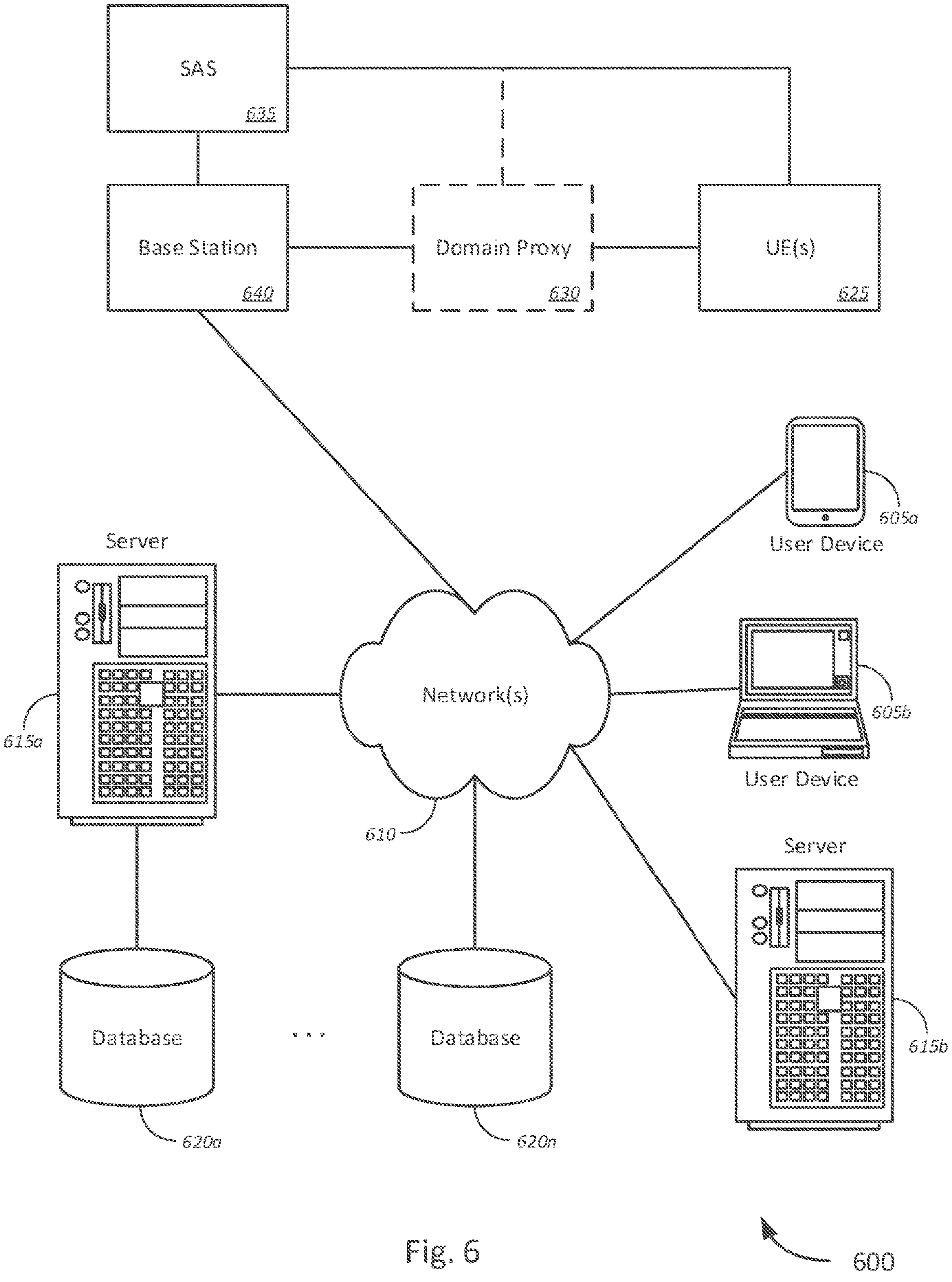
FIG. 6 is a schematic block diagram illustrating system of networked computer devices, in accordance with various embodiments.

FIG. 6 is a schematic block diagram illustrating system of networked computer devices, in accordance with various embodiments. The system 600 may include one or more user devices 605. A user device 605 may include, merely by way of example, desktop computers, single-board computers, tablet computers, laptop computers, handheld computers, edge devices, and the like, running an appropriate operating system. User devices 605 may further include external devices, remote devices, servers, and/or workstation computers running any of a variety of operating systems. A user device 605 may also have any of a variety of applications, including one or more applications configured to perform methods provided by various embodiments, as well as one or more office applications, database client and/or server applications, and/or web browser applications. Alternatively, a user device 605 may include any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 500 is shown with two user devices 605*a*-605*b*, any number of user devices 605 may be supported.

Certain embodiments operate in a networked environment, which can include a network(s) 610. The network(s) 610 can be any type of network familiar to those skilled in the art that can support data communications, such as an access network, core network, or cloud network, and use any of a variety of commercially-available (and/or free or proprietary) protocols, including, without limitation, MQTT, CoAP, AMQP, STOMP, DDS, SCADA, XMPP, custom middleware agents, Modbus, BACnet, NCTIP, Bluetooth, Zigbee/Z-wave, TCP/IP, SNA™, IPX™, and the like. Merely by way of example, the network(s) 610 can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network may include an access network of the service provider (e.g., an Internet service provider ("ISP")). In another embodiment, the network may include a core network of the service provider, backbone network, cloud network, management network, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 may be a data server, a web server, orchestration server, authentication server (e.g., TACACS, RADIUS, etc.), cloud computing device(s), or the like, as described above. The data server may include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, may include one or more application servers, which can be configured with one or more applications, programs, web-based services, or other network resources accessible by a client. Merely by way of example, the server(s) 615 can be one or more general purpose computers capable of executing programs or scripts in response to the user computers 605 and/or other servers 615, including, without limitation, web applications (which may, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620*a*-620*n* (collectively, "databases 620"). The location of each of the databases 620 is discretionary: merely by way of example, a database 620*a* may reside on a storage medium local to (and/or resident in) a server 615*a* (or alternatively, user device 605). Alternatively, a database 620*n* can be remote so long as it can be in communication (e.g., via the network 610) with one or more of these. In a particular set of embodiments, a database 620 can reside in a storage-area network ("SAN") familiar to those skilled in the art. In one set of embodiments, the database 620 may be a relational database configured to host one or more data lakes collected from various data sources. The databases 620 may include SQL, no-SQL, and/or hybrid databases, as known to those in the art. The database may be controlled and/or maintained by a database server.

The system 600 may further include one or more UEs 625, domain proxy 630, SAS 635, and base station 640. In various embodiments, the UE may be coupled to the base station 640, and the SAS 635. In some embodiments, the UE may optionally be coupled to the domain proxy 630, which may in turn be coupled to the SAS 635 and base station 640.

As previously described, the one or more UEs 625 may be configured to attempt to access a network, such as network 610, via the base station 630. Accordingly, the one or more UEs 625 may be configured to initiate a network access request with the base station 640. In some embodiments, the UE may be configured to generate and transmit a first network access request. The first network access request may be transmitted with a power limit corresponding to a max EIRP for EUDs in CBRS. For example, the power limit may be a maximum EIRP of 23 dBm/10 MHz. The first network access request may include one or more access sequences. Each access sequence includes a sequence of one or more access probes, RA preambles, or other suitable access request signal. In some embodiments, the one or more access request signals of each access sequence may be transmitted with increasing power. For example, an access sequence may include a sequence of access request signals. A first access request signal of the access sequence may be transmitted at a first power level lower than a second power level of a subsequence second access request signal. Each subsequent access request signal may be transmitted with increasing power until the power limit has been reached. In yet further embodiments, as previously described, level ramping may be implemented in the first access request. In various embodiments, a domain proxy may similarly be configured to generate and transmit the first access request as applicable.

In various embodiments, the UE 625 and/or domain proxy may be configured to determine whether a response has been received from the base station 640 and/or whether access has been granted by the base station 640 to the network 610. If it is determined that no response has been received after a maximum number of access sequences has been transmitted, the UE 625 and/or domain proxy 630 may be configured to cease transmission of the first access request. The UE 625 and/or domain proxy 630 may, in some embodiments, then transmit a second access request at a power level exceeding the power limit of the first access request. The second access request may similarly have a power limit, exceeding the power limit of the first access request, but less than a maximum EIRP associated with category a CBSDs.

To transmit signals at the higher power level in the CBRS spectrum, the UE 625 and/or domain proxy 630 may be configured to register with the SAS 635, and to transmit a respective spectrum access request to the SAS 635. As previously described, the spectrum access request may include one or more frequency ranges for which access is requested. The SAS 635 may, therefore, determine whether the one or more frequency ranges are available, and grant and/or deny access to the spectrum. Once spectrum access has been granted, the UE 625 and/or domain proxy may be configured to transmit the second network access request to the base station 640 at the higher power level. Like the first network access request, the second network access request may include one or more access sequences to be transmitted by the UE 625 and/or domain proxy 630. The access request signals of the access sequence of the second network access request may, accordingly, be transmitted with increasing power, and/or further be implemented with level ramping procedures as previously described.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to certain structural and/or functional components for ease of description, methods provided by various embodiments are not limited to any single structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in sequentially for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a specific structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to one embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system comprising:
- a base station coupled to a network;
- a spectrum access system;
- a user equipment coupled to the base station and the spectrum access system, the user equipment comprising:
  - a processor; and
  - non-transitory computer readable media comprising instructions executable by the processor to:
    - transmit a spectrum access request to the spectrum access system, wherein the spectrum access request includes a request for access to one or more frequency ranges of a spectrum;
    - obtain, via the spectrum access system, a spectrum access response, wherein the spectrum access response is indicative that access to at least one of the one or more frequency ranges of the spectrum has been granted;
    - in response to the spectrum access response, transmit a network access request to the base station; and
    - establish, in response to the response granting access to the network has been received from the base station, a communication channel with the base station,
- wherein the network access request is transmitted at a power level exceeding a first power limit and up to a second power limit, and
- wherein a first access sequence includes increasing the power of one or more access request signals, wherein the instructions are further executable by the processor to:
  - transmit a first access request signal of a first access sequence at a first power; and
  - transmit each subsequent access request signal of the one or more access request signals at a subsequent power greater than a preceding power, and wherein the subsequent power does not exceed the first power limit.

2. The system of claim 1, wherein the first power limit is a maximum equivalent isotropically radiated power of 23 dBm/10 MHz.

3. The system of claim 1, wherein the second power limit is a maximum equivalent isotropically radiated power of 30 dBm/10 MHz.

4. The system of claim 1, wherein the instructions are further executable by the processor to:
obtain, via the base station, a reference signal;
measure a reference signal power of the reference signal;
in response to determining that the reference signal power exceeds a first reference signal power threshold, enter a first operational mode, wherein in the first operational mode, one or more access request signals is repeated a first number of repetitions; and
in response to determining that the reference signal power does not exceed the first reference signal power threshold, enter a second operational mode, wherein in the second operational mode, the one or more access request signals is repeated a second number of repetitions greater than the first number of repetitions.

5. The system of claim 1, wherein the instructions are further executable by the processor to:
determine whether a first access sequence has been transmitted to the base station a maximum number of times; and
in response to determining that the first access sequence has not been transmitted to the based station the maximum number of times, repeat transmission of the first access sequence to the base station;
wherein the spectrum access request is transmitted after it is determined that the first access sequence has been transmitted to the base station the maximum number of times.

6. The system of claim 1, wherein the one or more access request signals includes one of one or more access probes or one or more random access preambles.

7. An apparatus comprising:
a processor; and
non-transitory computer readable media comprising instructions executable by the processor to:
transmit a spectrum access request to a spectrum access system, wherein the spectrum access request includes a request for access to one or more frequency ranges of a spectrum;
obtain, via the spectrum access system, a spectrum access response, wherein the spectrum access response is indicative that access to at least one of the one or more frequency ranges of the spectrum has been granted;
in response to the spectrum access response, transmit a network access request to the base station; and
establish, in response to the response granting access to the network has been received from the base station, a communication channel with the base station,
wherein the second network access request is transmitted at a power level exceeding a first power limit and up to a second power limit, and
wherein the instructions are further executable by the processor to:
transmit a first access request signal of a first access sequence at a first power; and
transmit each subsequent access request signal of the one or more access request signals at a subsequent power greater than a preceding power, and wherein the subsequent power does not exceed the first power limit.

8. The apparatus of claim 7, wherein the first power limit is a maximum equivalent isotropically radiated power of 23 dBm/10 MHz.

9. The apparatus of claim 7, wherein the instructions are further executable by the processor to:
obtain, via the base station, a reference signal;
measure a reference signal power of the reference signal;
in response to determining that the reference signal power exceeds a first reference signal power threshold, enter a first operational mode, wherein in the first operational mode, the or more access request signals is repeated a first number of repetitions; and
in response to determining that the reference signal power does not exceed the first reference signal power threshold, enter a second operational mode, wherein in the second operational mode, the one or more access request signals is repeated a second number of repetitions greater than the first number of repetitions.

10. The apparatus of claim 7, wherein the instructions are further executable by the processor to:
determine whether a first access sequence has been transmitted to the base station a maximum number of times; and
in response to determining that the first access sequence has not been transmitted to the based station the maximum number of times, repeat transmission of the first access sequence to the base station;
wherein the spectrum access request is transmitted after it is determined that the first access sequence has been transmitted to the base station the maximum number of times.

* * * * *